Figure 1:
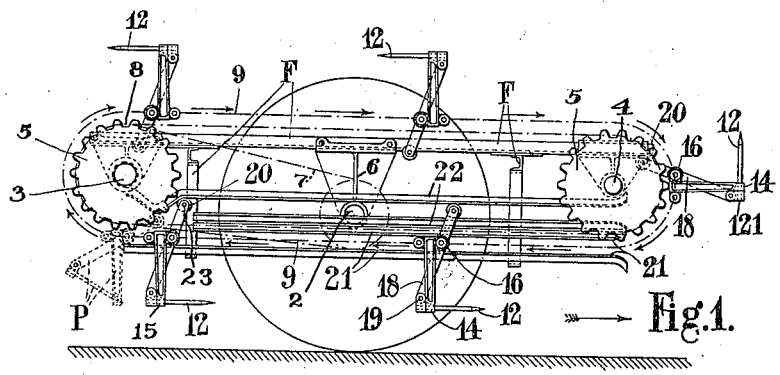

Apr. 10, 1923.

G. MICHOT

FLAX PULLING MACHINE

Filed July 15, 1920

INVENTOR
G. Michot
BY H. R. Kerslake
ATTORNEY

Patented Apr. 10, 1923.

1,451,231

UNITED STATES PATENT OFFICE.

GEORGES MICHOT, OF DROMARA, IRELAND, ASSIGNOR TO FIBRE CORPORATION LIMITED, OF LONDON, ENGLAND.

FLAX-PULLING MACHINE.

Application filed July 15, 1920. Serial No. 396,389.

*To all whom it may concern:*

Be it known that I, GEORGES MICHOT, a citizen of the Swiss Republic, and residing at Dromara, County Down, Ireland, have invented certain new and useful Improvements Relating to Flax-Pulling Machines, of which the following is a specification.

This invention relates to flax pulling machines and has for its object to produce an improved type of machine.

The essential feature of the machine is that an endless chain belt carried on two or more chain wheels is provided with combs mounted in such a relative position on the chain belt that as they pass along the lower side of the chain belt they are in a suitable position relative to the surface of the ground for engaging with the stalks of flax which it is intended to pull. By rotation of the chain wheels as the machine is advanced against the crop, the combs enter the flax, straighten it out and pull it out of the ground, the combs being then cleared by suitable devices.

The invention consists in a flax pulling machine comprising an endless chain belt or belts suitably mounted on the frame of the machine, a plurality of combs carried by the chain belt or belts in such manner that when at the lower side of the chain belt they are suitably disposed for engaging with the stalks of the flax to be pulled, and driving means from the road wheel or wheels of the machine to the chain belt or belts arranged in such manner that the movement of the combs when engaging with the stalks is forwards relative to the ground but backwards relative to the frame of the machine.

The invention also consists in means for clearing the pulled flax from the combs when at or near the rear of the machine and depositing it on the ground.

The invention also consists in a flax pulling machine, comprising a pair of road wheels fixed to a common axle, a frame on which the said axle is mounted and which projects laterally on one side of the road wheels to carry the chain belt gear, and driving means between the road wheel axle and the chain belt gear.

The invention also consists in the combination of a comb clearing frame in rigid relationship to two opposite links one on each of the two chains, straight guide rails for the lower portions of the chains fixed to the frame of the machine, a pair of levers jointed respectively to the said two links, a comb having its prongs slidable and swingable through the comb clearing frame, pivot joints between the backbone of the comb and the outer ends of the said levers, guide rollers mounted on the inner ends of the said levers, and guide rails for the said rollers fixed to the frame adapted to constrain the comb to move relative to the clearing frame as and when desired.

The chain wheels carrying the endless chain belts are mounted on suitable shafts carried by the framework, the front chain wheel shaft being at such height that the points of the prongs of the comb may enter the standing crop at the most suitable height above the ground. A means of tensioning the chain belt is also provided. The chain belts are driven by suitable gearing from the road wheel or wheels of the machine so arranged that while the combs are moving backward relatively to the machine itself, they travel forward relatively to the ground.

The prongs in passing through the flax, first straighten the flax by combing, and eventually engage firmly with the flax by means of the seed bolls, the continuous forward movement of the combs relative to the surface of the ground acting to pull up the plants.

The movement of the combs relative to the ground ensures the flax being pulled, while the backward movement of the chain belt at the lower side relative to the machine carries the pulled flax to the back of the chain belt where it is stripped from the combs by suitable cleaners.

The cleaners or clearers are mounted on the combs themselves and are suitably operated at the proper times by devices external to the combs.

I append drawings illustrating my invention as carried into effect in one form:

Figure 1 being an elevation, and

Figure 2:
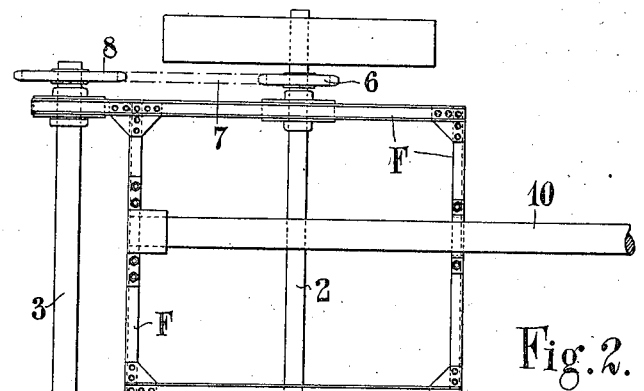

Figure 2 a plan of the machine, both somewhat diagrammatic.

The frame F of the machine is made in one nominally rigid structure adapted to support the road wheel axle 2 and the two shafts 3 and 4 on each of which a pair of chain wheels 5 are mounted. The chain belt gearing is supported at one side of the road wheels, one chain wheel shaft 3 at the rear of the frame, the other 4 in front. The rear chain wheel shaft is driven from the road wheel axle preferably by means of chain gearing, 6, 7, 8. The linear speed of the comb carrying chains, 9, relative to the frame is less than the linear speed of advance of the machine, the difference between the said speeds being the speed of advance of the combs through the crop if the frame be set with its guide rails horizontal. By suitably choosing the diameters of the chain wheels on the road wheel axle and rear chain wheel shaft respectively, the speed of advance of the combs through the crop may be made any desired fraction of that of the speed of advance of the machine.

The draught pole 10 is suitably fastened to the frame.

As the underside of the chain belt passes around the front chain wheels and traverses backwards from the front to the rear chain wheel, a comb carried thereby enters the flax, straightens it, pulls it from the ground, and drags the roots along the ground, the prongs of the comb during such action projecting forwards through its clearing frame.

The clearing frames 14 are each fixed between two opposite links of the two chain belts. A long slot 15 extends practically the whole width of the clearing frame; the prongs of the fork are slidable through and swing to a certain extent relative to the slot, which is widened towards the back to allow for the relative swing necessary, while its front has just sufficient clearance to permit the prongs to slide easily. Guide rollers 16 are mounted on one of the pins by which the links carrying the clearing frames are jointed to the adjacent links of the chain belt. Levers 18 are also pivotally mounted co-axially with the guide rollers 16. The outer ends of the levers 18 are jointed at 19 to the backbone 121 of the comb, and at their inner ends guide rollers 20 are mounted. During their backward movement relative to the framework the guide rollers 16 and 20 move between pairs of guide rails 21 and 22 respectively. The lower pair 21 is straight throughout, and serves to prevent the chain belt from sagging under its weight, and the stresses due to the combing and pulling of the flax. The upper pair 22 is also straight throughout the greater part of its length, and parallel to the lower pair, thereby keeping the clearing frame 14, lever 18 and comb of each set in the same relative position during the said movement. The upper rail of the upper pair 22 is bent at 23 in such manner as to oscillate the lever 18 as the comb approaches the rear chain wheels 5, and thereby withdraw the prongs of the comb through the clearing frame, and again return them to their former relative position. In the position of the parts shown by the dotted lines P, the flax is entirely released from the comb and deposited on the ground.

Having now particularly described and ascertained the nature of my said invention and in what manner the same is to be performed, I declare that what I claim is:—

1. A flax pulling machine including a single pair of road wheels, an axle supported by said wheels, a frame carried by the axle and projecting laterally beyond the road wheels, a pair of parallel endless chain belts mounted on the projecting portion of said frame, a plurality of combs carried by the chain belts in such manner that when at the lower side of the chain belts they are disposed for engaging with the stalks of the flax to be pulled, driving means arranged between the axle and chain belts arranged in such manner that the movement of the combs when engaging with the stalks is forward relatively to the ground but rearward relatively to the frame, clearing frames for the combs also carried by the chain belts, and means for effecting movement of the combs relatively to their respective clearing frames when near the rear of the machine for the purpose of depositing the pulled flax on the ground.

2. Means for clearing the pulled flax from the combs of a flax pulling machine as set forth in claim 1, comprising a comb clearing frame in rigid relationship to two opposite links one on each of the two chains, straight guide rails for the lower portions of the chains fixed to the frame of the machine, a pair of levers jointed respectively to the said two links, a comb having its prongs slidable and swingable through the comb clearing frame, pivot joints between the backbone of the comb and the outer ends of the said levers, guide rollers mounted on the inner ends of the said levers, and guide rails for the said rollers fixed to the frame adapted to constrain the comb to move relative to the clearing frame as and when desired.

In testimony whereof I have signed my name to this specification.

G. MICHOT.